United States Patent [19]
Kozak

[11] 3,806,604
[45] Apr. 23, 1974

[54] DOUGH CONDITIONER

[75] Inventor: Thomas J. Kozak, Parma Heights, Ohio

[73] Assignee: SCM Corporation, Cleveland, Ohio

[22] Filed: Oct. 26, 1970

[21] Appl. No.: 84,138

[52] U.S. Cl.................. 426/62, 426/24, 426/194
[51] Int. Cl................................................ A21d 2/16
[58] Field of Search................. 99/91, 118 R, 123

[56] References Cited
UNITED STATES PATENTS

| | | | |
|---|---|---|---|
| 3,433,645 | 3/1969 | Egan et al. | 99/91 X |
| 2,978,329 | 4/1961 | Cochran et al. | 99/91 X |
| 3,679,430 | 7/1972 | Birnbaum | 99/91 X |

*Primary Examiner*—A. Louis Monacell
*Assistant Examiner*—James Robert Hoffman
*Attorney, Agent, or Firm*—Merton H. Douthitt; S. I. Khayat; Russell L. Brewer

[57] ABSTRACT

Shock resistance of bread dough compositions is increased by including therein a non-agglomerating and free flowing particulate solid dough conditioner consisting of from about 70–90 parts by weight of a polyoxyethylene derivative of a fatty acid ester of glycerol or propylene glycol and a partial glyceride in a ratio of from 40 parts:60 parts to 60 parts:40 parts and from about 10–30 parts of triglyceride having a Wiley Melting Point of at least 140°F.

10 Claims, No Drawings

DOUGH CONDITIONER

Dough conditioners have been widely used in the manufacture of bakery products primarily to increase the shock resistance thereof and particularly the shock resistance of proofed, unbaked bread. Shock resistance is important in bread making, especially in continuous processing, to prevent the bread from collapsing.

Dough conditioners comprised ethoxylated emulsifiers, e.g., Tween (polyoxyethylene sorbitan monostearate) and ethoxylated glycerides. One of the problems of these types of dough conditioners was that they were semi-solid, often agglomerating for making the handling thereof difficult. Polyoxyethylene derivatives have been combined with hard partial glycerides to form a non-agglomerating product, but such product has normally been used for frozen desserts.

It has been found that improved dough conditioners having non-agglomerating properties for bakery products and particularly bread can be prepared by combining from about 70–90 parts of a polyoxyethylene derivative of a fatty acid ester of glycerol or propylene glycol, said fatty acid ester having from 12–22 carbon atoms, and a partial glyceride having at least 50 percent by weight monoglyceride content, said polyoxyethylene derivative and said partial glyceride being present in a ratio of from 40 parts: 60 parts to 60 parts:40 parts by weight, and from about 10–30 parts of a triglyceride having a Wiley Melting Point of at least 140°F.

Quite surprisingly, one would expect that the triglyceride incorporated in the dough conditioner would decrease the functionality of the resultant dough conditioner with respect to shock tolerance of bread loaves produced therefrom. In fact, from about 10–30 parts stearin per 100 parts dough conditioner composition enhances the functionality rather than diminishes it while at the same time renders the emulsifier non-clumping or non-agglomerating, thereby producing a dry, free flowing product.

By a polyoxyethylene derivative of a fatty acid ester of glycerol I mean the products conventionally referred to as ethoxylated monoglycerides. These products can be prepared in a variety of ways which are known. One of the primary methods for preparing the derivative is by ethoxylating a partial glyceride mixture containing from 10–90 percent monoglyceride and such process is shown in U.S. Pat. Nos. 3,490,918 and 3,433,645; such products and processes for making the ethoxylated monoglyceride described in these patents are incorporated by reference.

Another method of preparing the ethoxylated monoglyceride product is to react ethylene oxide with glycerol in the presence of an alkaline catalyst, then esterify the resultant product formed typically with a fatty acid or partial or triglyceride. For reasons of efficiency and economy, the polyoxyethylene derivatives of a fatty acid ester of glycerol are partial esters and predominantly mono-esters. Typically these esters have a hydroxyl value of between about 65 to 80, a saponification value of between about 65 to 75, and an acid value of 2.0 maximum.

By a polyoxyethylene derivative of a fatty acid ester of propylene glycol I refer to products prepared by the reaction of ethylene oxide and propylene glycol, followed by esterification under substantially the same conditions as required for preparing the ethoxylated glyceride by ethoxylating glycerol, followed by esterification. Thus, like glycerol, propylene glycol can be ethoxylated and the partial fatty acid esters prepared therefrom by reacting with a glyceride reaction or by reaction with a fatty acid. The polyoxyethylene derivatives of propylene glycol can also be prepared by reacting ethylene oxide with the propylene glycol esters in the same manner as one would react ethylene oxide with a partial glyceride as shown in U.S. Pat. Nos. 3,490,918 and 3,433,645.

The fatty acids for forming the fatty acid esters are those higher fatty acids having from about 12–22 carbon atoms. Additionally they can be either unsaturated or saturated. Typically these fatty acids include lactic, oleic, palmitic, stearic, linoleic, and others. Of course, those skilled in the art will appreciate that the fatty acid portion or radical can be supplied through an ester interchange reaction as, for example, by reacting the polyoxyethylene derivative of glycerol or propylene glycol with a glyceride.

The partial glycerides which can be used for forming the emulsifier composition are those commercial emulsifiers prepared by reacting a triglyceride with glycerin, i.e., super-glycerinated fat or by reacting a fatty acid with glycerin to form the partial glycerides. For reasons of efficiency and economy, the partial glycerides should contain at least 50 percent monoglyceride content by weight of the partial glyceride. Invariably, one will have in such reaction products diglyceride, a small proportion of triglyceride (10 percent or less by weight) and unreacted glycerin (5 percent or less by weight). But, such small amounts usually are not deleterious on the overall emulsifier composition properties, especially with respect to their dough conditioning effects. Monoglyceride content can be as high as 90 percent by weight and above but such compositions normally are not used because of the higher cost in obtaining a high purity of monoglyceride, thereby increasing the overall cost of the product. For reasons of efficiency and economy, the partial glyceride should have a Capillary Melting Point of at least 140°F.

It has been found that the combination of polyoxyethylene derivatives of a fatty acid ester of glycerol or propylene glycol and the partial glyceride be present in a ratio of from 40 parts: 60 parts to about 60 parts:40 parts by weight for achieving best results. Although this combination is effective at other ranges outside of the ratios set forth, the functionality of the emulsifier in the dough conditioner often decreases. Breads having greater shock resistance or cakes with higher cake volumes are produced with such dough conditioner whereas dough conditioners outside these ratios often have less shock tolerance and lower cake volumes. Therefore, for reasons of efficiency and economy, the combination of polyoxyethylene derivative and partial glyceride is maintained between the ratios set forth.

Triglycerides are used in formulating this non-agglomerating dough conditioner for purposes of aiding in the functionality thereof and for contributing to the non-agglomerating, non-clumping properties of the dough conditioner. The triglyceride should have a Wiley Melting Point of at least 140°F. and preferably at least 150°F. Triglycerides typically include glycerol tristearate, glycerol trioleate, glycerol tripalmitate and so forth. Stearin is preferably used as the triglyceride because of its low cost and high Wiley Melting Point (152°–158°F.). Optionally, small amounts of partial glycerides, 10 percent by weight, and unreacted glycerin can be present, but for reasons of efficiency and economy, the product should be essentially triglyceride.

The proportion of triglyceride to the emulsifier should be between about 10–30 parts as opposed to 70–90 parts of the emulsifier in making up the dough conditioner. When less than 10 parts by weight are employed, the dough conditioner does not possess desirable dry, free flowing, non-agglomerating properties. When over 30 parts of triglyceride are used in formulating the dough conditioner, the functionality of the resultant dough conditioner is reduced and the level of dough conditioner in the final product must be increased to achieve the same results. The preferred level of triglyceride in the dough conditioner is about 20 parts stearin and 80 parts of the emulsifier combination consisting of the polyoxyethylene derivative and a partial glyceride. At the levels of triglyceride and emulsifier combination as set forth, the dough conditioner can be formed into a beaded product for ease of handling. Beads generally are between about 30 and 60 U.S. Standard Sieve.

Dough conditioners can be included in a proportion of from 0.1–10 percent and generally between 0.5–1 percent by weight, basis weight of flour used in the product.

The following examples are provided to illustrate preferred embodiments of the invention but are not intended to limit the scope thereof. All parts are parts by weight, all percentages are weight percentages and all degrees are degrees Fahrenheit, unless otherwise specified.

EXAMPLE 1

An emulsifier blend of 40 parts of a commercial ethoxylated monoglyceride having 20 moles ethylene oxide per mole of glycerin and 60 parts of a commercial saturated monoglyceride having a monoglyceride content of 55 percent and a Capillary Melting Point of from 140°–146°F. are blended in a mixer to form the blend. 80 parts of this resultant blend then are added to 20 parts stearin having a Wiley Melting Point of 152°–158°F., the stearin triglyceride being at a temperature of 180°F. and mixed. The resultant molten mixture then is spray-chilled to form a finely divided solid phase dough conditioner product.

To determine the non-agglomerating properties of the dough conditioner with other commercial dough conditioners, the following test is conducted. The finely divided dough conditioner obtained above and calcium stearoyl-2-lactylate is packaged in a polyethylene bag and stored in a room maintained at a temperature between 110°–115°F. and an 85–95 percent relative humidity for 21 days. Samples of 150 grams are taken at the 7 and 21 day intervals and compared with the product at the beginning of the test. The 150 gram samples are sized on a Fisher-Wheeler Sieve shaker at 700 vibrations per minute for 15 minutes. The table below indicates the sieve number and the percentage of product retained on each sieve by weight.

TABLE I

| | Polyoxyethylene Dough Conditioner of Ex. 1 | | | Calcium Stearoyl-2-Lactylate | | |
|---|---|---|---|---|---|---|
| Days Storage U.S. Standard Sieve No. (1) | 0 | 7 | 21 | 0 | 7 | 21 |
| 20 | 19.5 | 24.0 | 41.2 | 0.7 | Product Fused Into a Solid Mass After Seven Days of Storage | |
| 30 | 17.4 | 19.3 | 16.7 | 10.1 | | |
| 40 | 12.1 | 7.4 | 8.7 | 16.1 | | |
| 60 | 36.9 | 31.3 | 26.7 | 22.1 | | |

The commercial dough conditioning agent, calcium stearoyl-2-lactylate, fuses into a solid mass after 7 days and cannot be sieved. Thus, the above results show that the dough conditioner has an extreme resistance to agglomeration and is retained in a dry, free flowing form even under severe conditions.

EXAMPLE 2

To determine the functionality of a dough conditioner prepared in like manner as the dough conditioner in Example 1 with different levels of stearin in the dough conditioner, from 10–30 parts, to a commercial dough conditioner containing no stearin therein, the following tests are conducted. The bread made with the dough conditioner has the formula:

| Ingredient | By Weight |
|---|---|
| Bread Flour | 100.00 parts |
| Water | 67.00 parts |
| Sugar | 2.00 parts |
| Salt | 2.00 parts |
| Sodium Propionate | 0.10 parts |
| Yeast | 3.25 parts |
| Yeast Food | 0.75 parts |
| Potassium Bromate | 60 ppm |
| Potassium Iodate | 15 ppm |
| Dough Conditioner | 0.50 parts |
| Sugar | 5.00 parts |
| Nonfat Dry Milk Solids | 2.00 parts |
| Hydrogenated Shortening | 3.00 parts |

The resultant bread is evaluated for the percent shock loss, softening effect in terms of inch/grams, which is a measurement of the amount of work required to depress the crumb in a loaf of bread, and bread score which is an evaluation of the bread on a scoring basis between about 80–100, 100 being a perfect score and 80 being the minimum acceptable level for the bread. Factors relevant in determining bread score are: specific volume, symmetry, break and shred (crust separation from the crumb), character of crust, thickness, etc., cell wall structure as to uniformity, crumb color, odor and taste. The results are set forth in Table II below:

TABLE II

| Dough Conditioner | % Stearine by weight in Dough Conditioner | % Shock Loss | Specific Volume | Softening Effect (inch/grams) | Bread Score |
|---|---|---|---|---|---|
| 40 parts ethoxylated monoglyceride/ 60 parts monoglyceride – 50% mono-alpha content | 0 | 5.0 | 6.62 | 39.3 | 88 |
| do. | 10 | 4.5 | 6.78 | 40.6 | 86 |
| do. | 20 | 4.1 | 6.83 | 36.5 | 88 |
| do. | 30 | 8.4 | 6.90 | 43.2 | 89 |

What is claimed is:

1. A non-agglomerating particulate solid dough conditioner having free flowing properties consisting of:
   a. from about 70–90 parts of an emulsifier consisting of a polyoxyethylene derivative of a fatty acid ester of glycerol or propylene glycol, the fatty acid moiety of said ester having from 12–22 carbon atoms, and a partial glyceride having at least 50 percent by weight monoglyceride content, said polyoxyethylene derivative and said partial glyceride being present in a ratio of from 40 parts:60 parts to 60 parts:40 parts by weight, and
   b. from about 10–30 parts of a triglyceride having a Wiley Melting Point of at least 140°F.

2. The composition of claim 1 wherein said polyoxyethylene derivative is an ethoxylated glyceride having from about 10–30 moles of ethylene oxide combined with each mole of glycerol ester.

3. The composition of claim 1 wherein said polyoxyethylene derivative is an ethoxylated propylene glycol ester having from about 10–30 moles ethylene oxide combined with each mole propylene glycol ester.

4. The composition of claim 2 wherein said triglyceride is stearin.

5. The composition of claim 3 wherein said triglyceride is stearin.

6. In an unbaked bread dough composition comprising flour, yeast, water, salt, sugar and a dough conditioner for increasing the shock resistance thereof, the improvement wherein said dough conditioner is a non-agglomerating particulate solid having free flowing properties consisting of:
   a. from about 70–90 parts of an emulsifier consisting of a polyoxyethylene derivative of a fatty acid ester of glycerol or propylene glycol, the fatty acid moiety of said ester having from 12–22 carbon atoms, and a partial glyceride having at least 50% by weight monoglyceride content, said polyoxyethylene derivative and said partial glyceride being present in a ratio of from 40 parts : 60 parts to 60 parts : 40 parts by weight and
   b. from about 10–30 parts of a triglyceride having a Wiley Melting Point of at least 140°F., with said dough conditioner being present in said bread dough composition in a amount of from about 0.1 to 10 percent by weight based on the weight of the flour.

7. The bread composition of claim 6 wherein said polyoxyethylene derivative is an ethoxylated glyceride having from about 10–30 moles of ethylene oxide combined with each mole of glycerol ester.

8. The bread composition of claim 7 wherein said triglyceride is stearin.

9. The bread composition of claim 6 wherein said polyoxyethylene derivative is an ethoxylated propylene glycol ester having from about 10–30 moles ethylene oxide combined with each mole propylene glycol ester.

10. The bread composition of claim 6 wherein said triglyceride is stearin.

* * * * *